United States Patent
Shamoto

(10) Patent No.: US 8,864,196 B2
(45) Date of Patent: Oct. 21, 2014

(54) PEDESTRIAN COLLISION DETECTION DEVICE

(75) Inventor: Takehisa Shamoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/640,375

(22) PCT Filed: Apr. 13, 2010

(86) PCT No.: PCT/JP2010/056588
§ 371 (c)(1),
(2), (4) Date: Nov. 27, 2012

(87) PCT Pub. No.: WO2011/128971
PCT Pub. Date: Oct. 20, 2011

(65) Prior Publication Data
US 2013/0127190 A1    May 23, 2013

(51) Int. Cl.
*B60R 19/48* (2006.01)
*B60R 19/18* (2006.01)
*B60R 21/0136* (2006.01)
*B60R 19/04* (2006.01)

(52) U.S. Cl.
CPC .............. *B60R 19/483* (2013.01); *B60R 19/18* (2013.01); *B60R 2019/188* (2013.01); *B60R 21/0136* (2013.01); *B60R 19/04* (2013.01); *B60R 2019/1886* (2013.01)
USPC ...... 293/117; 293/107; 296/1.04; 296/187.04

(58) Field of Classification Search
USPC ................. 293/107, 109, 110, 117, 120, 122; 296/1.04, 187.04; 340/436
See application file for complete search history.

(56) References Cited

U.S. PATENT DOCUMENTS

| | | | | |
|---|---|---|---|---|
| 4,099,759 | A  * | 7/1978 | Kornhauser | 293/110 |
| 7,804,414 | B2 * | 9/2010 | Kiribayashi | 340/614 |
| 8,128,140 | B2 * | 3/2012 | Tanabe | 293/117 |
| 2007/0090931 | A1 * | 4/2007 | Hawes et al. | 340/436 |
| 2007/0200692 | A1 | 8/2007 | Kamel et al. | |

(Continued)

FOREIGN PATENT DOCUMENTS

| JP | A-62-122848 | 6/1987 |
|---|---|---|
| JP | A-63-76004 | 4/1988 |

(Continued)

*Primary Examiner* — Glenn Dayoan
*Assistant Examiner* — Jason S Daniels
(74) *Attorney, Agent, or Firm* — Oliff PLC

(57) ABSTRACT

A pedestrian collision detection device is obtained that is capable of improving pedestrian detection performance in the vicinity of a bumper corner portion. A pedestrian collision detection device includes a chamber member disposed with pressure detectors, and an ECU is connected to the pressure detectors. Terminal portions of the chamber member are wrapped around so as to cover vehicle width direction outside end faces of bumper reinforcement at bumper corner portion sides. When a load of a specific value or greater is input to the terminal portions of the chamber member from a bumper cover side during a collision, the terminal portions obtain a reactive force from the bumper reinforcement and undergo compression deformation towards the vehicle width direction inside, and the pressure inside a pressure chamber of the chamber member changes.

6 Claims, 7 Drawing Sheets

(56) References Cited

U.S. PATENT DOCUMENTS

| | | |
|---|---|---|
| 2008/0315598 A1* | 12/2008 | Takafuji et al. ............... 293/117 |
| 2009/0015392 A1 | 1/2009 | Takahashi et al. |
| 2009/0021029 A1* | 1/2009 | Kiribayashi ................... 293/117 |
| 2009/0024323 A1 | 1/2009 | Tanabe |
| 2009/0050395 A1* | 2/2009 | Hosokawa et al. ........... 180/274 |
| 2009/0108598 A1 | 4/2009 | Takahashi |
| 2009/0160204 A1* | 6/2009 | Czopek et al. ................ 293/133 |
| 2010/0038922 A1* | 2/2010 | Takahashi et al. ............ 293/117 |

FOREIGN PATENT DOCUMENTS

| | | |
|---|---|---|
| JP | A-2006-290212 | 10/2006 |
| JP | A-2007-69707 | 3/2007 |
| JP | A-2007-223535 | 9/2007 |
| JP | A-2009-18734 | 1/2009 |
| JP | A-2009-23407 | 2/2009 |
| JP | A-2009-196463 | 9/2009 |

\* cited by examiner

PEDESTRIAN COLLISION DETECTION DEVICE

TECHNICAL FIELD

The present invention relates to a pedestrian collision detection device for detecting a collision between a pedestrian and a vehicle bumper.

BACKGROUND ART

In vehicle collision detection devices, devices are known that are provided with an absorber that is disposed at a vehicle front side of bumper reinforcement and deforms during a collision, a chamber member of which an internal portion configures a pressure chamber, and a pressure sensor that detects changes in pressure in the pressure chamber. In such devices, configuration is made for example such that a front edge of the chamber member is positioned further to the vehicle rear side than a front edge of the absorber, suppressing pressure changes inside the chamber in a minor collision, and improving pedestrian discrimination performance (see for example Patent Document 1).

Patent Document 1: Japanese Patent Application Laid-Open (JP-A) No. 2009-18734

DISCLOSURE OF INVENTION

Problems to be Solved by the Invention

However, in such structures, no consideration is given to pedestrian detection in the vicinity of bumper corner portions, leaving room for improvement from the perspective of pedestrian detection performance. Note that it is conceivable that a collision with a pedestrian could be made detectable over a wide range in the vehicle width direction by extending the bumper reinforcement towards the vehicle width direction outsides; however this would incur an increase in weight and increase in cost.

In consideration of the above circumstances, an object of the present invention is to obtain a pedestrian collision detection device capable of improving pedestrian detection performance in the vicinity of bumper corner portions.

Means for Solving the Problems

A pedestrian collision detection device according to a first aspect of the present invention is applied to a vehicle bumper including a bumper reinforcement disposed with length direction oriented in a vehicle width direction as a bumper framework member spanning between vehicle front-rear direction outside end portions of a pair of left and right side members and a bumper cover disposed at a vehicle front-rear direction outside of the bumper reinforcement, with length direction oriented in the vehicle width direction along the bumper reinforcement and with both length direction end portions bent towards the vehicle front-rear direction inside, the pedestrian collision detection device including: a chamber member disposed adjacent to a vehicle front-rear direction outside face of the bumper reinforcement, with length direction oriented in the vehicle width direction along the bumper reinforcement and an inside portion of the chamber member configured as a pressure chamber; a spacer disposed at a back face of the bumper cover at a location corresponding to a vehicle width direction outside terminal portion of the chamber member; a pressure detector that is disposed in the chamber member and that outputs a signal according to changes in pressure inside the pressure chamber; and a collision determination section that determines whether or not a collision with a pedestrian has occurred based on output from the pressure detector, wherein a vehicle width direction outside terminal portion of the chamber member is wrapped around so as to cover a vehicle width direction outside end face of the bumper reinforcement at a bumper corner portion side, and is configured such that when a load of a specific value or greater is input from the bumper cover side during a collision, the vehicle width direction outside terminal portion of the chamber member obtains reaction force of the bumper reinforcement and undergoes compression deformation towards the vehicle width direction inside.

According to the pedestrian collision detection device of the first aspect of the present invention, the chamber member is pressed through the bumper cover when a pedestrian collides with the vehicle bumper. When this occurs, the pressure inside the pressure chamber changes, and this pressure change is detected by the pressure detector. Determination is made in the collision determination section as to whether or not a collision with a pedestrian has occurred based on the output from the pressure detector.

In the present invention the vehicle width direction outside terminal portion of the chamber member is wrapped around so as to cover a vehicle width direction outside end face of the bumper reinforcement at the bumper corner portion side, and obtains reaction force of the bumper reinforcement and undergoes compression deformation towards the vehicle width direction inside when a load of a specific value or greater is input from the bumper cover side during a collision. Accordingly, when a pedestrian collides with the bumper cover in the vicinity of the bumper corner portion of the vehicle bumper and a specific load or greater is input to the terminal portion of the chamber member through the bumper cover, the terminal portion of the chamber member obtains reaction force of the bumper reinforcement and undergoes compression deformation towards the vehicle width direction inside and the pressure inside the pressure chamber changes.

Moreover, the spacer is disposed at a back face of the bumper cover at a location corresponding to a vehicle width direction outside terminal portion of the chamber member. Hence, when a pedestrian has collided with a bumper cover in the vicinity of a bumper corner portion of the vehicle bumper, load is input to the terminal portion of the chamber member through the spacer disposed to the bumper cover. Collision load is accordingly appropriately transmitted to the pressure chamber during a collision.

A second aspect of the present invention is the pedestrian collision detection device of the first aspect further including a bumper absorber for impact absorption, which is interposed between the bumper cover and the bumper reinforcement with length direction oriented in the vehicle width direction, and which is disposed alongside the chamber member over a range excluding the terminal portion of the chamber member.

According to the pedestrian collision detection device of the second aspect of the present invention, the spacer is disposed at the back face of the bumper cover at a location corresponding to the terminal portion of the chamber member. Load is accordingly input to the terminal portion of the chamber member through the spacer disposed at the bumper cover when a collision occurs between a pedestrian and the bumper cover in the vicinity of the bumper corner portion of the vehicle bumper. Collision load is thereby appropriately transmitted to the pressure chamber during a collision.

According to the pedestrian collision detection device of the second aspect of the present invention, the bumper absorber for impact absorption interposed between the bumper cover and the bumper reinforcement is oriented with length direction the vehicle width direction and is disposed alongside the chamber member over a range excluding the terminal portion of the chamber member. When a pedestrian is involved in a collision at a vehicle width direction central side of the vehicle bumper, the chamber member undergoes compression deformation in the vehicle front-rear direction, accompanying compression deformation of the bumper absorber through the bumper cover. However, when a pedestrian has collided with the bumper cover in the vicinity of the bumper corner portion of the vehicle bumper, the terminal portion of the chamber member undergoes compression deformation towards the vehicle width direction inside, accompanying bending deformation of the bumper cover. Accordingly, a collision with a pedestrian can be detected with good precision even at the bumper corner portion by adjusting the bending rigidity of the bumper cover at the bumper corner portion to substantially match the F-S characteristics (the force-stroke characteristics) of the bumper absorber.

A third aspect of the present invention is the pedestrian collision detection device of the first aspect further including a bumper absorber for impact absorption, which is interposed between the bumper cover and the bumper reinforcement with length direction oriented in the vehicle width direction, and which is disposed alongside the chamber member over a range including the terminal portion of the chamber member, wherein a cut away portion is formed to flange portions of circular arc shaped wheel arches formed at both length direction end portions of the bumper cover.

According to the pedestrian collision detection device of the third aspect of the present invention, the spacer is disposed at the back face of the bumper cover at a location corresponding to the terminal portion of the chamber member. Load is accordingly input to the terminal portion of the chamber member through the spacer disposed at the bumper cover when a pedestrian is involved in a collision with the bumper cover in the vicinity of the bumper corner portion of the vehicle bumper. Collision load is thereby appropriately transmitted to the pressure chamber during a collision.

According to the pedestrian collision detection device of the third aspect of the present invention, the bumper absorber for impact absorption interposed between the bumper cover and the bumper reinforcement is oriented with length direction in the vehicle width direction and is disposed alongside the chamber member over a range including the terminal portion of the chamber member. The cut away portions are formed to the flange portions of the circular arc shaped wheel arches formed at both length direction end portions of the bumper cover. Deformation load of the bumper cover is accordingly suppressed due to the bumper cover deforming around the cut away portion as the origin when a pedestrian has collided with the bumper cover in the vicinity of the bumper corner portion of the vehicle bumper. By adjusting the F-S characteristics (the force-stroke characteristics) of the bumper absorber at the bumper corner portion, a collision with a pedestrian can accordingly be detected with good precision even at the bumper corner portion.

A fourth aspect of the present invention is the pedestrian collision detection device of any one of the first aspect to the third aspect, wherein a cap is attached to both vehicle width direction outside end faces of the bumper reinforcement, and faces of the caps that face the spacers across the chamber member are configured parallel to the vehicle front-rear direction.

According to the pedestrian collision detection device of the fourth aspect of the present invention, the caps are attached to both vehicle width direction outside end faces of the bumper reinforcement. The terminal portions of the chamber member can be configured without forming a negative angle with respect to the vehicle front-rear direction since the faces of the caps that face the spacers across the chamber member are configured parallel to the vehicle front-rear direction. The terminal portions of the chamber member can therefore be formed without undercutting.

Effects of the Invention

As described above, the pedestrian collision detection device according to the first aspect of the present invention exhibits the excellent advantageous effect of enabling an improvement to pedestrian detection performance in the vicinity of the bumper corner portion.

The pedestrian collision detection device according to the second aspect of the present invention exhibits the excellent advantageous effect that detection of a collision with a pedestrian can be performed with good precision even at the bumper corner portion by adjusting the bending rigidity of the bumper cover at the bumper corner portion to substantially match the F-S characteristics of the bumper absorber.

The pedestrian collision detection device according to the third aspect of the present invention exhibits the excellent advantageous effect that detection of a collision with a pedestrian can be performed with good precision even at the bumper corner portion, by adjusting the F-S characteristics of the bumper absorber at the bumper corner portion.

The pedestrian collision detection device according to the fourth aspect of the present invention exhibits the excellent advantageous effect of enabling the terminal portions of the chamber member to be formed without undercutting.

BEST MODE FOR CARRYING OUT THE INVENTION

First Exemplary Embodiment

Figure 1:
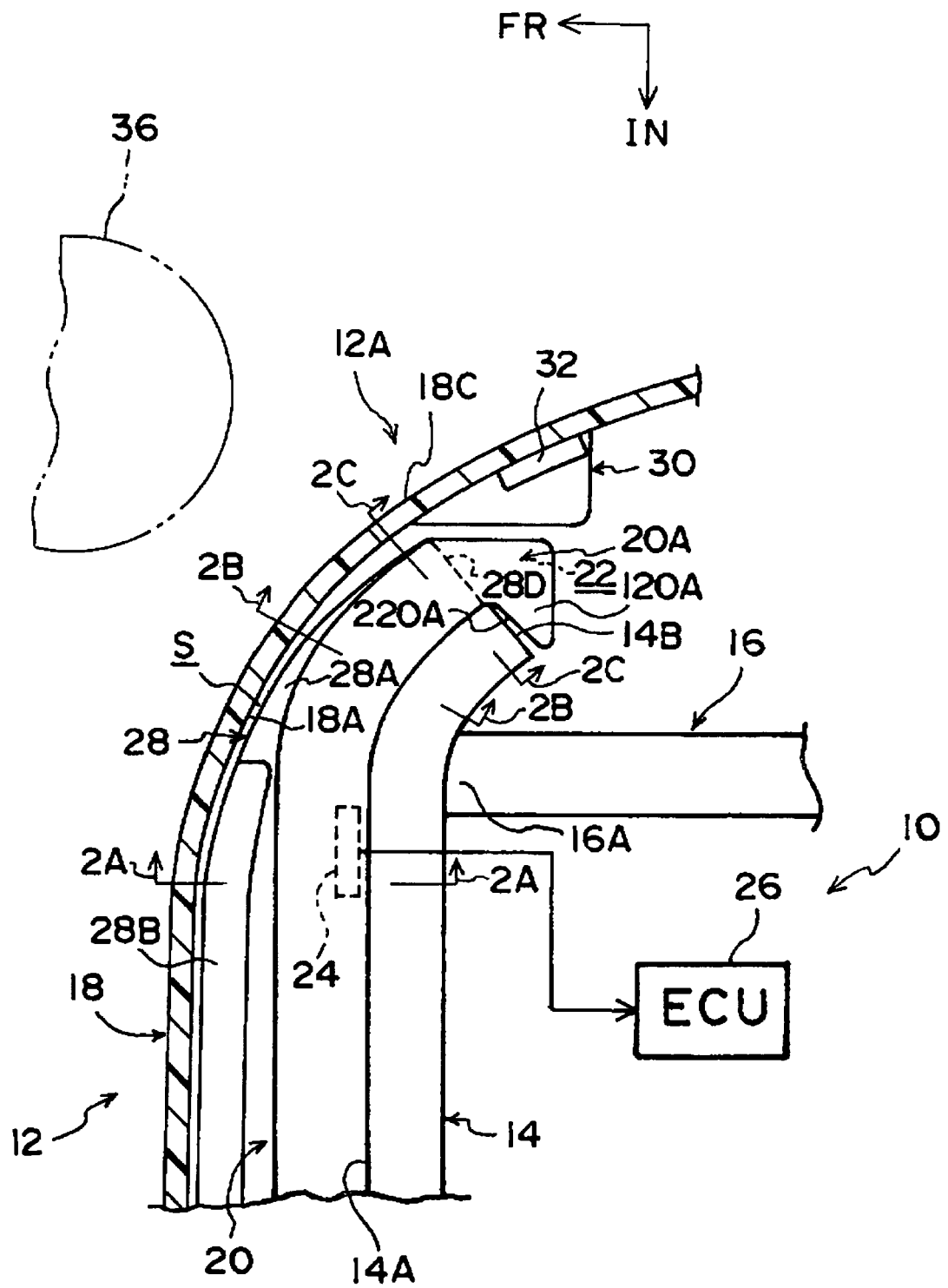
FIG. 1 is a plan view cross-section illustrating a schematic configuration of a pedestrian collision detection device according to a first exemplary embodiment of the present invention, showing only the vehicle width direction right-hand side half.

Explanation follows regarding a pedestrian collision detection device according to a first exemplary embodiment of the present invention, with reference to FIG. 1 to FIG. 4. Note that in the drawings, the arrow FR indicates a vehicle front side, the arrow UP indicates the vehicle top side, and the arrow IN indicates the vehicle width direction inside, as appropriate.

FIG. 1 is a schematic plan view cross-section of an outline configuration of a pedestrian collision detection device 10 (a pedestrian detection system) according to the present exemplary embodiment. The structure of the pedestrian collision detection device 10 is substantially left-right symmetric as seen in plan view of the vehicle. FIG. 1 shows only the vehicle width direction right-hand half. As illustrated in FIG. 1, the pedestrian collision detection device 10 is applied to a front bumper 12 serving as a vehicle bumper disposed at a front end of a vehicle, and is configured so as to determine whether or not the front bumper 12 has been involved in a collision. Specific explanation is given below.

The front bumper 12 is provided with a bumper reinforcement 14 that is a bumper framework member. The bumper reinforcement 14 is formed by for example press forming an iron or aluminum based metal material, and configures a framework member disposed with the length direction thereof in the vehicle width direction. The bumper reinforcement 14 spans between front ends 16A of a left and right pair of front side members 16 configuring a vehicle body side framework member, and is supported by the vehicle body.

The front bumper 12 is further provided with a bumper cover 18 that covers the bumper reinforcement 14 from the vehicle front-rear direction outside, namely from the vehicle front side. The bumper cover 18 is configured from a resin material and is disposed along the bumper reinforcement 14 with the length direction thereof in the vehicle width direction. As seen in vehicle plan view, both length direction end portions of the bumper cover 18 are configured with a profile that bends around towards the vehicle front-rear direction inside, namely towards the vehicle rear side. The front bumper 12 is accordingly provided with bumper corner portions 12A including corners 18C of the bumper cover 18 at both vehicle width direction end sides. The bumper corner portions 12A indicate regions at which the front bumper 12 deforms towards the vehicle width direction inside when a collision occurs between a pedestrian at the front side of the vehicle and the front bumper 12. That is to say, the bumper corner portions 12A indicate end portions of the front bumper 12 that are further to the vehicle width direction outside than the front side members 16. The bumper cover 18 is supported by the vehicle body in a fixed state at a portion(s) not shown in the drawings, such that a space S is formed between the bumper cover 18 and the bumper reinforcement 14.

A chamber member 20 is disposed inside the space S between the bumper reinforcement 14 and the bumper cover 18 in the front bumper 12. The chamber member 20 is formed by for example blow molding and is configured as a hollow structured body disposed along the bumper reinforcement 14 with the length direction thereof in the vehicle width direction. The chamber member 20 is disposed adjacent to a front face 14A that is the vehicle front-rear direction outside face of the bumper reinforcement 14, and is attached to the front face 14A in a fixed state.

Vehicle width direction outside terminal portions 20A of the chamber member 20 wrap around so as to cover vehicle width direction outside end faces 14B of the bumper reinforcement 14 at the side of the bumper corner portions 12A. In the present exemplary embodiment, the terminal portions 20A of the chamber member 20 are provided with extension portions 120A that extend towards the vehicle width direction inside. Front faces 220A of the extension portions 120A face the vehicle width direction outside end faces 14B of the bumper reinforcement 14.

Figure 2A:
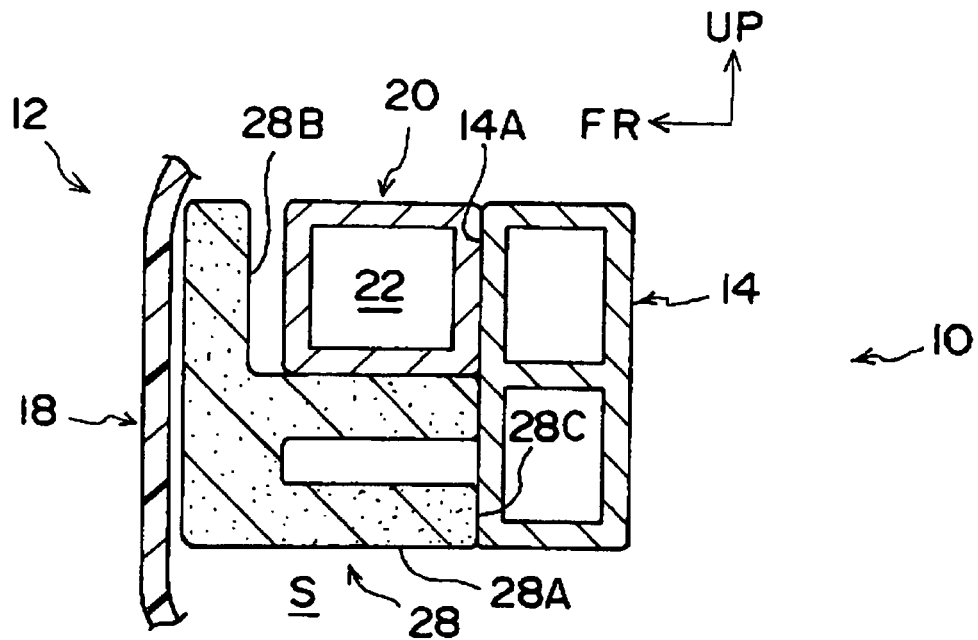
FIG. 2A is an enlarged vertical cross-section illustrating a front bumper applied with the pedestrian collision detection device according to the first exemplary embodiment of the present invention, taken along line 2A-2A of FIG. 1.

Attached in a fixed state to the bumper reinforcement 14 as described above, the chamber member 20 has sufficient rigidity to be able to maintain a hollow cross-sectional profile, and is provided with communication hole(s) in communication with the atmosphere at positions not shown in the drawings. FIG. 2A shows an enlarged cross-section taken along line 2A-2A in FIG. 1. The inside of a pressure chamber 22, this being the interior space of the chamber member 20 illustrated in FIG. 2A, is configured such that it is usually (statically) at atmospheric pressure. The chamber member 20 is configured so as to crush when subject to a relatively low compression load from the vehicle front, whilst air escapes through the communication hole(s), decreasing the volume of the pressure chamber 22 whilst dynamically changing the internal pressure of the pressure chamber 22. The terminal portions 20A of the chamber member 20 illustrated in FIG. 1 are configured to obtain reaction force from the bumper reinforcement 14 and undergo compression deformation towards the vehicle width direction inside when load of a specific value or higher is input from the bumper cover 18 side during a collision.

Locations on a back face 18A of the bumper cover 18 corresponding to the terminal portions 20A of the chamber member 20 are provided with spacers 30. The spacers 30 are configured from material with high mechanical strength, for example a fiber reinforced plastic (FRP) of a resin such as polypropylene (PP), filled with a filler such as talc and employing a fiber such as glass fiber as a reinforcement material.

Figure 3:
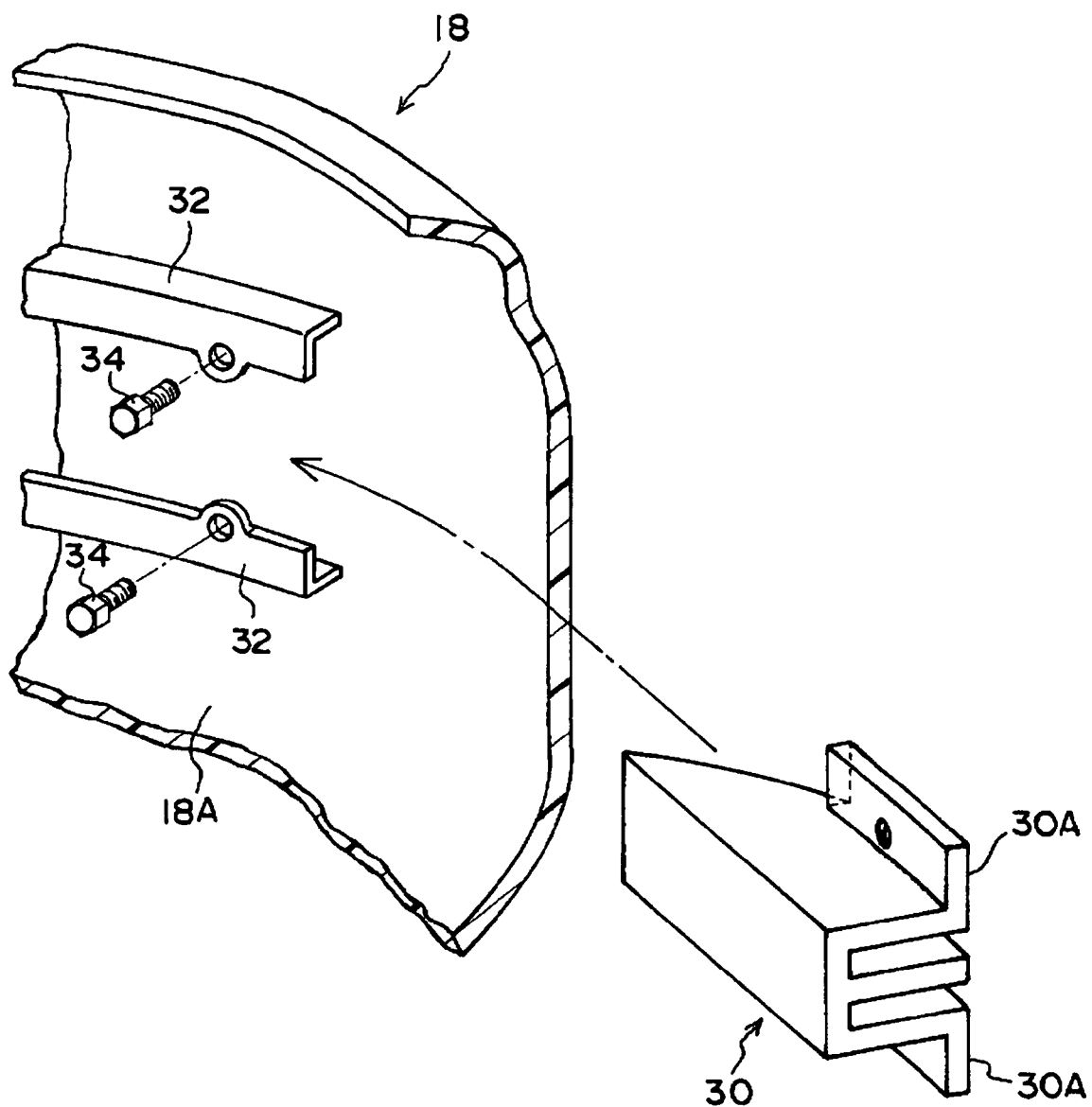
FIG. 3 is an exploded perspective view to illustrate the attachment of a spacer shown in FIG. 1 to a bumper cover.

FIG. 3 is an exploded perspective view illustrating an attachment structure of one of the spacers 30 to the bumper cover 18, in a state prior to attachment of the spacer 30 to the bumper cover 18. As illustrated in FIG. 3, an attachment base portion side of the spacer 30 is formed with a top and bottom pair of flange portions 30A. Both vehicle width direction sides of the back face 18A of the bumper cover 18, to which the spacers 30 will be attached, are formed with a top and bottom pair of substantially L-shaped rail portions 32 extending along the bumper cover 18 length direction. The flange portions 30A of the spacers 30 are inserted into the rail portions 32 formed on the side of the back face 18A of the bumper cover 18 and fixed to the bumper cover 18 by fasteners 34. As illustrated in FIG. 1, mutually opposing faces of the spacers 30 and the terminal portions 20A of the chamber member 20 are parallel to the vehicle front-rear direction.

The pedestrian collision detection device 10 is further provided with pressure detectors 24 (pressure sensors) disposed at a vehicle rear side inside face of the chamber member 20 on the vehicle front-rear direction inside of the chamber member 20. Note that although in FIG. 1 a pressure detector 24 on the vehicle width direction right side is shown, a pressure detector (not shown in the drawings) is also provided on the vehicle width direction left side, at a left-right symmetric position to the pressure detector 24 shown in FIG. 1 as seen in vehicle plan view. Each of the pressure detectors 24 is configured to output the same signal with respect to the same pressure, and they are respectively configured to output signals according to pressure changes inside the pressure chamber 22 to an ECU 26 serving as a collision determination section, which is described later.

A bumper absorber 28 for impact absorption is interposed between the front face 14A of the bumper reinforcement 14 and the bumper cover 18, more to the vehicle width direction inside than the bumper corner portions 12A. The bumper absorber 28 is independent from the chamber member 20, and is attached in a fixed state to a front face lower portion of the bumper reinforcement 14. The length direction of the bumper absorber 28 is oriented in the vehicle width direction, and the bumper absorber 28 is disposed alongside the chamber member 20 over a range of the chamber member 20 excluding the terminal portions 20A. In FIG. 1, a vehicle width direction outside end face of the bumper absorber 28 is shown by the numeral 28D.

Figure 2B:
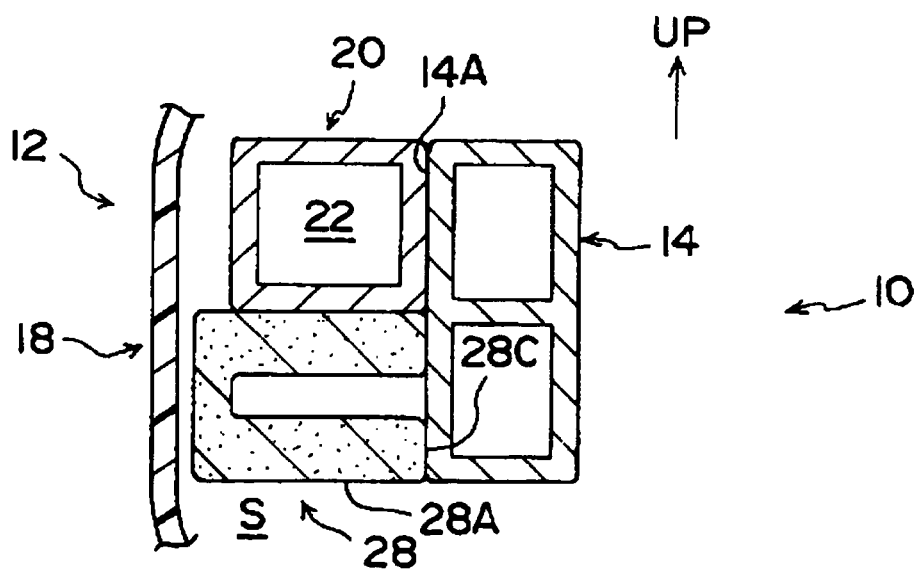
FIG. 2B is an enlarged vertical cross-section illustrating a front bumper applied with the pedestrian collision detection device according to the first exemplary embodiment of the present invention, taken along line 2B-2B of FIG. 1.
Figure 2C:
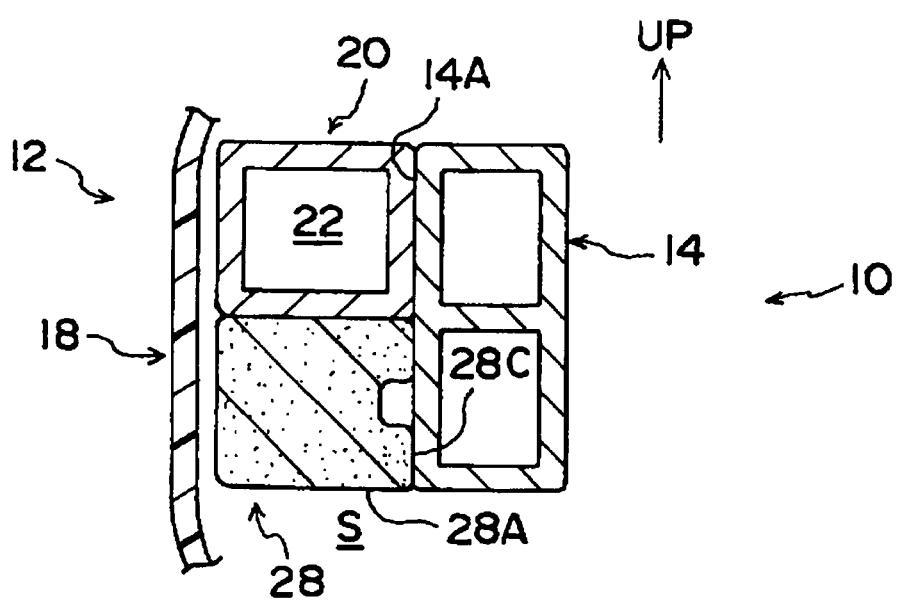
FIG. 2C is an enlarged vertical cross-section illustrating a front bumper applied with the pedestrian collision detection device according to the first exemplary embodiment of the present invention, taken along line 2C-2C of FIG. 1.

FIG. 2B is an enlarged cross-section taken along line 2B-2B in FIG. 1. FIG. 2C is an enlarged cross-section taken along line 2C-2C in FIG. 1. As illustrated in FIG. 2A, FIG. 2B and FIG. 2C, the bumper absorber 28 includes an absorber main body 28A positioned at the vehicle bottom side of the chamber member 20 in an attached state to the bumper reinforcement 14, and a spacer portion 28B (see FIG. 2A) positioned at the vehicle front side of the chamber member 20. A rear end portion 28C of the absorber main body 28A is fixed to the front face 14A of the bumper reinforcement 14.

The bumper absorber 28 is configured from for example urethane foam and is configured so as to undergo compression deformation and absorb impact energy in response to a frontal collision. Accordingly, the pedestrian collision detection device 10 is configured such that the pressure chamber 22 of the chamber member 20 undergoes compression deformation, so as to decrease in volume accompanying compression deformation of the bumper absorber 28.

The ECU 26 illustrated in FIG. 1 is electrically connected to the pressure detectors 24, and is configured so as to determine whether or not a collision between a pedestrian and the front bumper 12 has occurred based on output signals from the pressure detectors 24. In the present exemplary embodiment, the ECU 26 determines whether or not a collision between a pedestrian and the front bumper 12 has occurred based on pressure waveforms that are detection values from the two pressure detectors 24. The ECU 26 is set with a first threshold value Pt1 and a second threshold value Pt2 (>Pt1) that is greater than the first threshold value Pt1. The ECU 26 is configured such that it determines that a collision has occurred between the front bumper 12 and a pedestrian if the detection value of a first of either of the two pressure detectors 24 exceeds the first threshold value Pt1 and the detection value of the other out of either of the two pressure detectors 24 exceeds the second threshold value Pt2.

Note that there are other pedestrian determination methods (determination logic) for determining whether or not a collision has occurred between a pedestrian and a front bumper (12) by employing effective mass. In such pedestrian determination methods, for example an ECU (26) calculates the effective mass of the colliding object by employing a pressure detector (24), detecting pressure according to collision load and outputting a signal according to collision load, as a load sensor. The values of load being applied to a vehicle body front section are detected by the load sensor, integrated over time from collision start, and divided by the vehicle speed (detected by a vehicle speed sensor). The ECU (26) determines that the colliding object is a pedestrian if the effective mass is within a specific load range preset as being that of a pedestrian.

Operation and Advantageous Effects

Explanation follows regarding operation and effects of the present exemplary embodiment.

When a pedestrian (leg region thereof) 36, illustrated by the intermittent double-dashed line in FIG. 1, collides with the front bumper 12, the chamber member 20 is pressed through the bumper cover 18. When this occurs, the pressure inside the pressure chamber 22 (see for example FIG. 2A) changes, and this pressure change is detected by the pressure detectors 24. The ECU 26 determines whether or not a collision with a pedestrian 36 has occurred based on the output from the pressure detectors 24.

Figure 4:
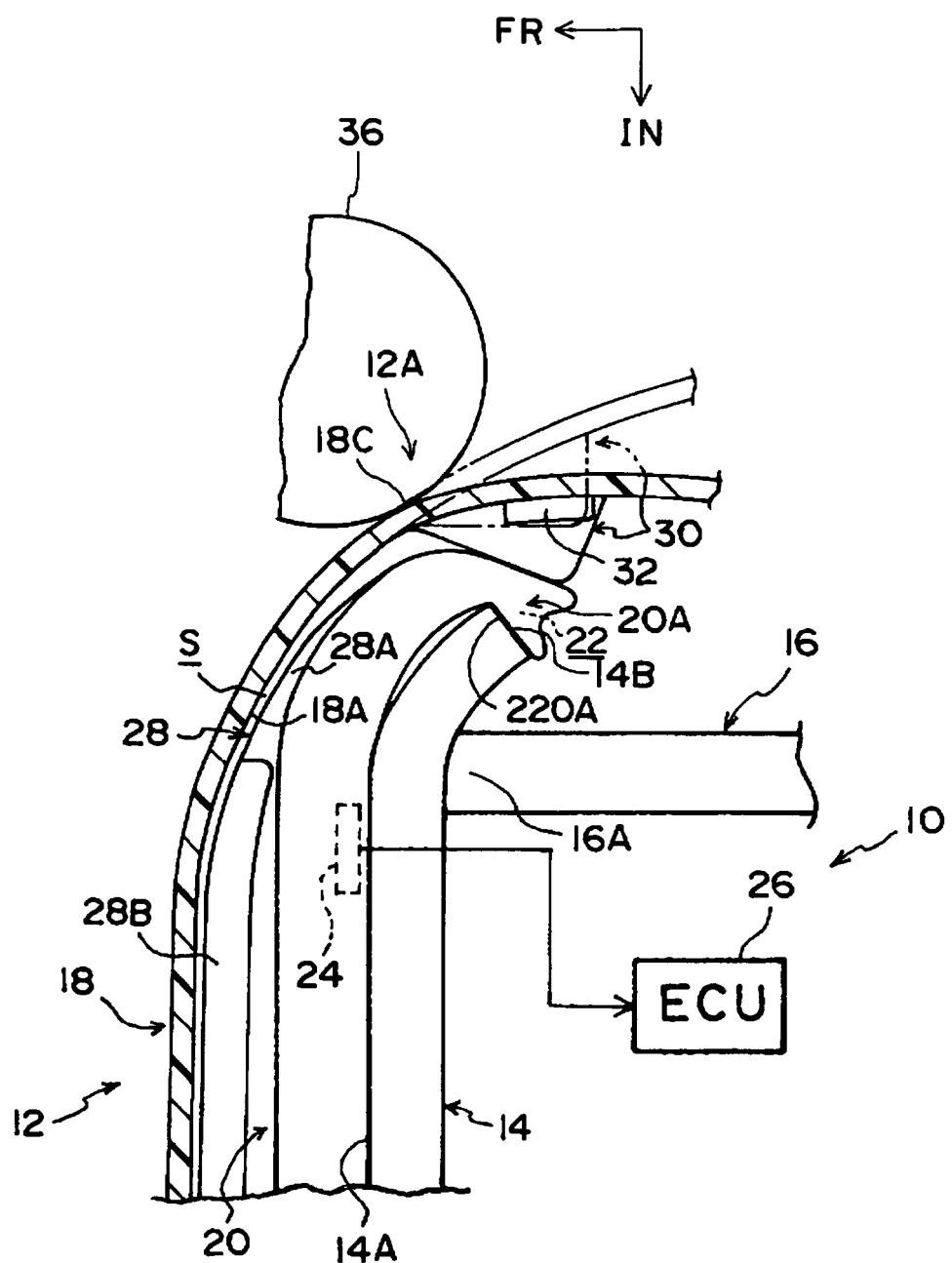
FIG. 4 is a plan view cross-section illustrating a deformed state of a front bumper corner portion during a collision with a pedestrian in the configuration illustrated in FIG. 1.

In the present exemplary embodiment, the vehicle width direction outside terminal portions 20A of the chamber member 20 wrap around so as to cover the vehicle width direction outside end faces 14B of the bumper reinforcement 14 at the side of the bumper corner portions 12A, and when a load of a specific value or greater is input from the bumper cover 18 side during a collision, the terminal portions 20A obtain a reactive force from the bumper reinforcement 14 and undergo compression deformation towards the vehicle width direction inside. Accordingly, as illustrated in FIG. 4, when the pedestrian 36 collides with the bumper cover 18 in the vicinity of a bumper corner portion 12A of the front bumper 12 and a load of a specific value or greater is input to the terminal portion 20A of the chamber member 20 through the bumper cover 18, the terminal portion 20A of the chamber member 20 obtains a reaction force from the bumper reinforcement 14 and undergoes compression deformation towards the vehicle width direction inside. The internal pressure of the pressure chamber 22 (see FIG. 2C) accordingly changes.

In the present exemplary embodiment, as illustrated in FIG. 1, the spacers 30 are disposed at the back face 18A of the bumper cover 18 at locations corresponding to the terminal portions 20A of the chamber member 20. Accordingly, as illustrated in FIG. 4, when the pedestrian 36 collides with the bumper cover 18 in the vicinity of the bumper corner portion 12A of the front bumper 12, load is input to the terminal portion 20A of the chamber member 20 through the spacer 30 disposed at the bumper cover 18. The collision load during a collision is accordingly appropriately transmitted to the pressure chamber 22 and the pressure chamber 22 is effectively crushed, thereby improving sensing performance in the vicinity of the bumper corner portions 12A.

As illustrated in FIG. 1, in the present exemplary embodiment the impact absorption bumper absorber 28 interposed between the bumper cover 18 and the bumper reinforcement 14 is disposed with length direction oriented in the vehicle width direction and alongside the chamber member 20 over a range excluding the terminal portions 20A of the chamber member 20. When the pedestrian 36 collides with a vehicle width direction central side of the front bumper 12, the chamber member 20 undergoes compression deformation towards the vehicle rear side accompanying compression deformation of the bumper absorber 28 through the bumper cover 18. However, as illustrated in FIG. 4, when the pedestrian 36 collides with the bumper cover 18 in the vicinity of the bumper corner portion 12A of the front bumper 12, the chamber member 20 undergoes compression deformation towards the vehicle width direction inside accompanying bending deformation of the bumper cover 18. Accordingly, a collision with the pedestrian 36 can also be detected with good precision at the bumper corner portions 12A by adjusting the bending rigidity of the bumper cover 18 at the bumper corner portions 12A to substantially match the F-S characteristics (force-stroke characteristics) of the bumper absorber 28.

Supplementary explanation follows, drawing comparisons with a comparative structure. For example, in a comparative structure wherein vehicle width direction end portions of the bumper reinforcement and the chamber member are respectively rounded and disposed over a range including terminal portions of the bumper corner portions, the chamber member can obtain a reaction force from the bumper reinforcement when a collision load acts on the chamber member in the vicinity of the bumper corner portions. Pedestrian detection performance can accordingly be secured by the comparative structure; however on the other hand there are disadvantages incurred of an increase in weight and an increase in cost. In contrast, in the exemplary embodiment described above, pedestrian detection performance can be secured whilst suppressing an increase in weight and increase in cost, since a configuration is applied wherein the bumper reinforcement 14 is shorter than that of the comparative structure above.

As explained above, the pedestrian collision detection device 10 of the present exemplary embodiment can improve pedestrian detection performance in the vicinity of the bumper corner portions 12A.

Second Exemplary Embodiment

Figure 5:
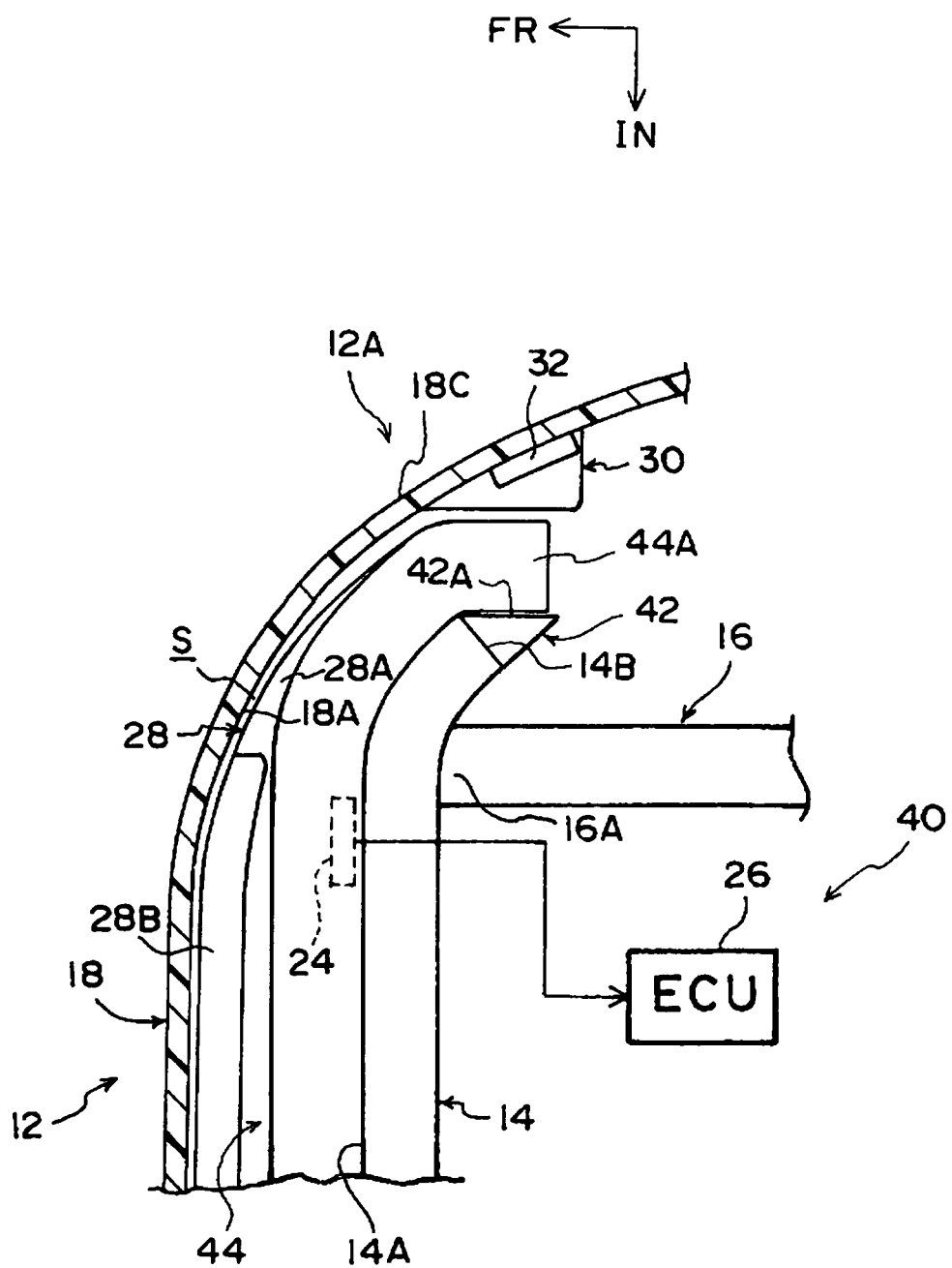
FIG. 5 is a plan view cross-section illustrating a schematic configuration of a pedestrian collision detection device according to a second exemplary embodiment of the present invention, showing only the vehicle width direction right-hand side half.

Explanation follows regarding a pedestrian collision detection device 40 according to a second exemplary embodiment of the present invention, with reference to FIG. 5. FIG. 5 is a schematic plan view cross-section of an outline configuration of the pedestrian collision detection device 40 according to the second exemplary embodiment of the present invention. As illustrated in FIG. 5, the pedestrian collision detection device 40 differs from the pedestrian collision detection device 10 (see FIG. 1) of the first exemplary embodiment in the respect that both vehicle width direction outside end faces 14B of a bumper reinforcement 14 are fitted with a cap 42 and the extension portions 120A (see FIG. 1) of the first exemplary embodiment are not formed to terminal portions 44A of a chamber member 44. Other configuration is substantially the same as the configuration of the first exemplary embodiment. Accordingly configuration elements that are effectively the same as in the first exemplary embodiment are allocated the same reference numerals and explanation thereof is omitted.

As illustrated in FIG. 5, the chamber member 44 has effectively the same configuration as the chamber member 20 (see FIG. 1) of the first exemplary embodiment with the exception of the point that the extension portions 120A (see FIG. 1) are not present. The vehicle width direction outside terminal portions 44A of the chamber member 44 wrap around so as to cover vehicle width direction outside end faces 14B of the bumper reinforcement 14 at bumper corner portion 12A sides.

The caps 42 attached to both vehicle width direction outside end faces 14B of the bumper reinforcement 14 are configured such that faces 42A face spacers 30 across the terminal portions 44A of the chamber member 44 and are parallel to the vehicle front-rear direction. Namely, configuration is made such that when a load of a specific value or greater is input to the terminal portion 44A of the chamber member 44 through the spacer 30 from a bumper cover 18 side during a collision, the terminal portion 44A of the chamber member 44 obtains a reactive force from the bumper reinforcement 14 side through the cap 42, and the chamber member 44 undergoes compression deformation towards the vehicle width direction inside.

According to the configuration of present exemplary embodiment explained above, as well as obtaining similar operation and advantageous effects as in the first exemplary embodiment, the terminal portions 44A of the chamber member 44 can be formed without undercutting since a negative angle with respect to the vehicle front-rear direction does not need to be formed.

Note that in the present exemplary embodiment, the caps 42 are configured with the faces 42A that face the spacers 30 across the terminal portions 44A of the chamber member 44 and are parallel to the vehicle front-rear direction. However, the concept of "parallel to the vehicle front-rear direction" in the present invention includes not only cases that are completely parallel to the vehicle front-rear direction, but also cases that, although they could not be said to be completely parallel to the vehicle front-rear direction, are effectively parallel to the vehicle front-rear direction and capable of obtaining effectively the same operation and advantageous effects as if they were completely parallel to the vehicle front-rear direction.

Third Exemplary Embodiment

Figure 6:
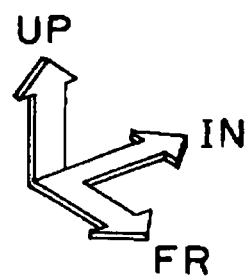
FIG. 6 is a perspective view illustrating a right-hand side front end section of a vehicle applied with a pedestrian collision detection device according to a third exemplary embodiment of the present invention.
Figure 6:
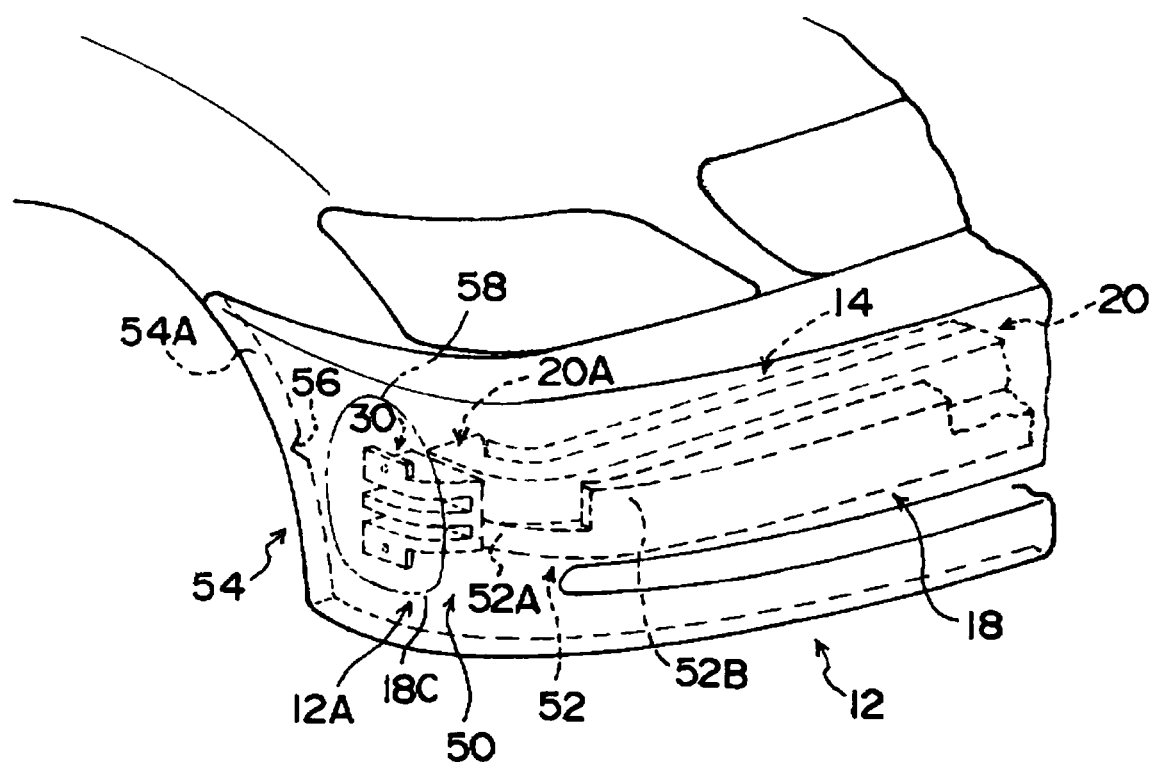

Explanation follows regarding a pedestrian collision detection device 50 according to a third exemplary embodiment of the present invention, with reference to FIG. 6. FIG. 6 is a perspective view illustrating a front end section of a vehicle to which the pedestrian collision detection device 50 according to the third exemplary embodiment of the present invention has been applied. Note that the configuration of present exemplary embodiment is effectively the same as that of the first exemplary embodiment, with the exception of the points described below. Accordingly, configuration elements that are effectively the same as in the first exemplary embodiment are allocated the same reference numerals and further explanation thereof is omitted.

As illustrated in FIG. 6, a bumper absorber 52 for impact absorption is interposed between a bumper cover 18 and a bumper reinforcement 14. The bumper absorber 52 is independent from a chamber member 20 and is attached to a front face lower portion of the bumper reinforcement 14 in a fixed state, with the length direction thereof oriented in the vehicle width direction and disposed alongside the chamber member 20 over a range including terminal portions 20A of the chamber member 20. Both vehicle width direction outside end sides of the bumper absorber 52 are positioned over a range that includes bumper corner portions 12A.

The bumper absorber 52 includes an absorber main body 52A that corresponds to the absorber main body 28A (see FIG. 2B and FIG. 2C) of the first exemplary embodiment and a spacer portion 52B that corresponds to the spacer portion 28B (see FIG. 2A) of the first exemplary embodiment. The absorber main body 52A is disposed at a bottom side of the terminal portions 20A of the chamber member 20 at both vehicle width direction end portions. Note that the bumper absorber 52 is similar to the bumper absorber 28 (see FIG. 1) of the first exemplary embodiment in other respects, such as the material from which it is configured. In FIG. 6, the spacer portion 52B is shown cut away at locations at the vehicle width direction central side.

A circular arc shaped wheel arch 54 is formed at both length direction end portions of the bumper cover 18, with cut away portions 56 (notches) are formed to flange portions 54A of the wheel arches 54 to allow easy folding of both length direction end portions of the bumper cover 18.

In the configuration of the present exemplary embodiment described above, when a pedestrian is involved in a collision with the bumper cover 18 in the vicinity of the bumper corner portion 12A of the front bumper 12, the bumper cover 18 readily deforms with the cut away portion 56 as the origin, such that the location surrounded by the intermittent double-dashed line 58 dents. A stable deformation mode towards the vehicle width direction inside can accordingly be achieved, and deformation load of the bumper cover 18 can be suppressed. Accordingly, a collision with a pedestrian can be detected with good precision even at the bumper corner portions 12A by adjusting the F-S characteristics (the force-stroke characteristics) of the absorber main body 52A of the bumper absorber 52 in the bumper corner portion 12A. Namely, according to the configuration of the present exemplary embodiment, pedestrian detection performance can be improved in the vicinity of the bumper corner portions 12A.

Supplementary Explanation of Exemplary Embodiments

Note that in the above exemplary embodiments, examples have been illustrated wherein the pedestrian collision detection devices 10, 40, 50 are applied to the front bumper 12 that serves as a vehicle bumper; however, the present invention is not limited thereto, and each of the configurations above may for example be front-rear reversed and applied to a rear bumper serving as a vehicle bumper.

Also, in the above exemplary embodiments, in the pedestrian collision detection devices 10, 40, 50 the spacers 30 are disposed at the back face 18A of the bumper cover 18 at locations corresponding to the terminal portions 20A, 44A of the chamber members 20, 44. Such a configuration is preferable from the perspective of transmitting collision load to the chamber members 20, 44 in an appropriate manner during a collision; however, configuration may be made wherein the pedestrian collision detection device is not provided with the spacers 30.

As a modified example of the third exemplary embodiment above, the pedestrian collision detection device may also be configured such that for example the chamber member 44 of the second exemplary embodiment illustrated in FIG. 5 is provided in place of the chamber member 20, and the caps 42 are attached at both vehicle width direction outside end faces of the bumper reinforcement 14, with faces 42A of the caps 42 facing the spacers 30 across the chamber member 44 and configured parallel to the vehicle front-rear direction. According to such a configuration, as well as obtaining similar operation and advantageous effects to the third exemplary embodiment, the terminal portions 44A of the chamber member 44 can be formed without undercutting since a negative angle with respect to the vehicle front-rear direction does not need to be formed to the terminal portions 44A of the chamber member 44.

The invention claimed is:

1. A pedestrian collision detection device applied to a vehicle bumper including a bumper reinforcement disposed with length direction oriented in a vehicle width direction as a bumper framework member spanning between vehicle front-rear direction outside end portions of a pair of left and right side members and a bumper cover disposed at a vehicle front-rear direction outside of the bumper reinforcement, with length direction oriented in the vehicle width direction along the bumper reinforcement and with both length direction end portions bent towards the vehicle front-rear direction inside, the pedestrian collision detection device comprising:

a chamber member disposed adjacent to a vehicle front-rear direction outside face of the bumper reinforcement, with length direction oriented in the vehicle width direction along the bumper reinforcement and an inside portion of the chamber member configured as a pressure chamber;

a spacer disposed at a back face of the bumper cover at a location corresponding to a vehicle width direction outside terminal portion of the chamber member;

a pressure detector that is disposed in the chamber member and that outputs a signal according to changes in pressure inside the pressure chamber; and a collision determination section that determines whether or not a collision with a pedestrian has occurred based on output from the pressure detector, wherein a vehicle width direction outside terminal portion of the chamber member is wrapped around so as to cover a vehicle width direction outside end face of the bumper reinforcement at a bumper corner portion side, and is configured such that when a load of a specific value or greater is input from a lateral side of the bumper cover during a collision, the spacer is configured to transmit the load from the bumper cover to the chamber member and the vehicle width direction outside terminal portion of the chamber member obtains reaction force of the bumper reinforcement and undergoes compression deformation towards the vehicle width direction inside.

2. The pedestrian collision detection device of claim 1, further comprising:

a bumper absorber for impact absorption, which is interposed between the bumper cover and the bumper reinforcement with length direction oriented in the vehicle width direction, and which is disposed alongside the chamber member over a range excluding the terminal portion of the chamber member.

3. The pedestrian collision detection device of claim 1, further comprising:

a bumper absorber for impact absorption, which is interposed between the bumper cover and the bumper reinforcement with length direction oriented in the vehicle width direction, and which is disposed alongside the chamber member over a range including the terminal portion of the chamber member, wherein a cut away portion is formed to flange portions of circular arc shaped wheel arches formed at both length direction end portions of the bumper cover.

4. The pedestrian collision detection device of claim 1, wherein a cap is attached to both vehicle width direction outside end faces of the bumper reinforcement, and faces of the caps that face the spacers across the chamber member are configured parallel to the vehicle front-rear direction.

5. The pedestrian collision detection device of claim 2, wherein a cap is attached to both vehicle width direction outside end faces of the bumper reinforcement, and faces of the caps that face the spacers across the chamber member are configured parallel to the vehicle front-rear direction.

6. The pedestrian collision detection device of claim 3, wherein a cap is attached to both vehicle width direction outside end faces of the bumper reinforcement, and faces of the caps that face the spacers across the chamber member are configured parallel to the vehicle front-rear direction.

* * * * *